Dec. 25, 1934.  R. G. CRAIGHEAD  1,985,630
BALANCED ADVERTISING DEVICE
Filed Jan. 19, 1934   2 Sheets-Sheet 1

INVENTOR
REX G. CRAIGHEAD
BY
ATTORNEY

Dec. 25, 1934.  R. G. CRAIGHEAD  1,985,630
BALANCED ADVERTISING DEVICE
Filed Jan. 19, 1934  2 Sheets-Sheet 2
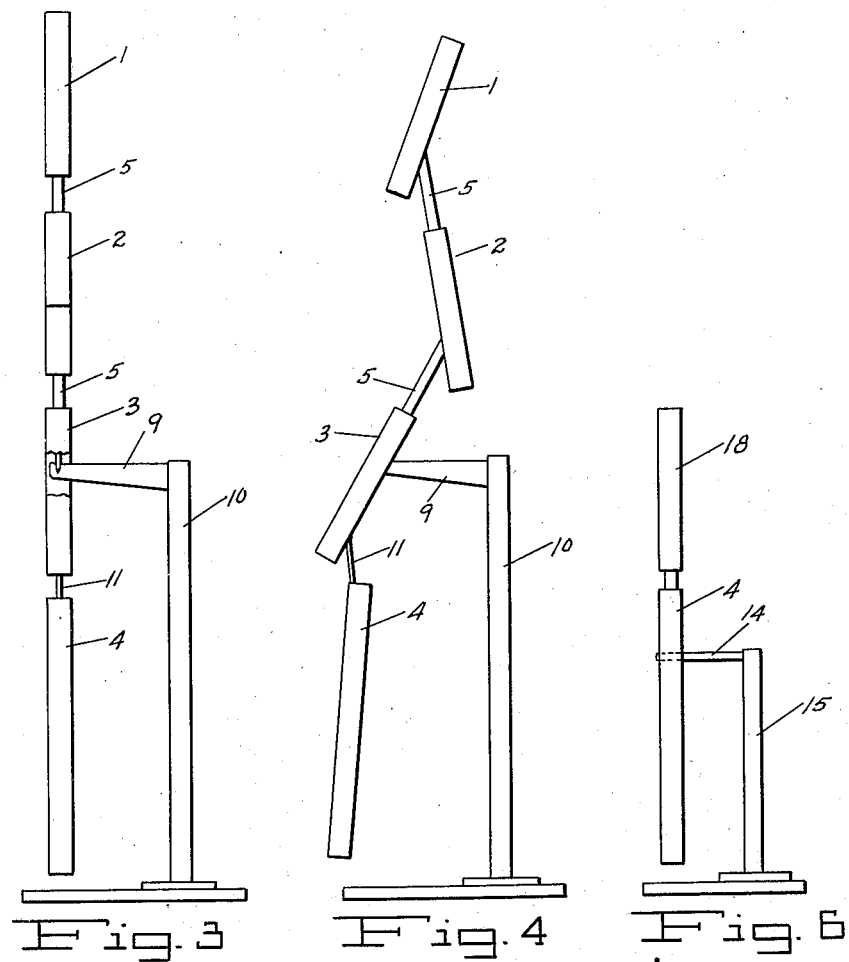
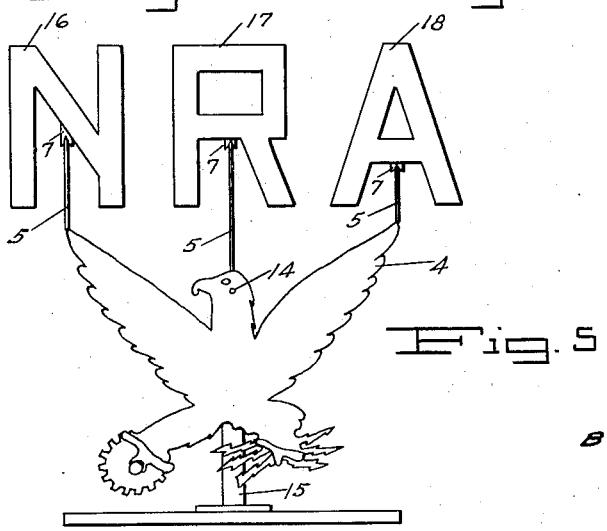
INVENTOR
REX G. CRAIGHEAD
BY
ATTORNEY Patented Dec. 25, 1934

1,985,630

UNITED STATES PATENT OFFICE 1,985,630

BALANCED ADVERTISING DEVICE

Rex G. Craighead, The Dalles, Oreg.

Application January 19, 1934, Serial No. 707,328

7 Claims. (Cl. 40—138)

My invention relates to an advertising device which in its preferred form consists of a plurality of superposed units, such as letters of the alphabet, signs, pictures, etc. These units are each provided with counter balancing elements which constantly maintain such units in an upright position. The balancing elements are so regulated that a combination of the units, one upon the other, is likewise maintained in an upright position, though a limited amount of movement is provided for between the respective units in order that the combined units as well as the individual units are permitted to sway, rock and swing, whereby it may appear that the superposed units are about to overbalance, it being one of the objects of the invention to create this sensation or appearance in order to attract attention to the device.

Another of the objects is to provide balancing members upon which the units balance which are so constructed that the units are permitted to sway and gyrate at the same time not becoming reversed or out of order with regard to one another.

Another object of the invention is to provide counter balancing means which may be so regulated that the lower units may be maintained in balancing condition notwithstanding the fact that other units are balanced thereupon.

Other, further and additional objects of the invention will appear upon reading the description following, aided by the drawings, wherein—

Figure 3 is a side elevation of Figure 1.

Figure 4 is a side elevation of Figure 2.

Figures 5 and 6 are respectively front and side elevations of another embodiment or arrangement of my invention.

Figure 1:
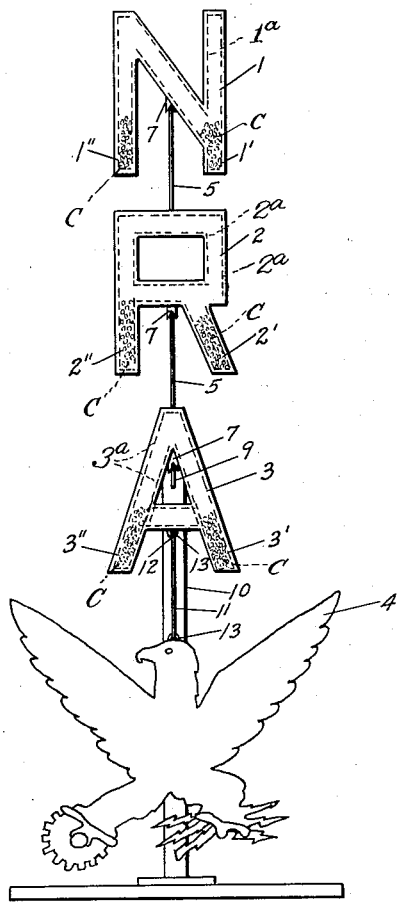
Figure 1 is a front elevation of an assembly of advertising units, one balanced upon the other.

In the drawings, 1, 2, 3 and 4 represent advertising units, three of which in this instance represent letters of the alphabet and the fourth an emblem. However this invention is not limited to the type of units shown in the drawings, as it will be readily seen that the invention may be applied to other types of units.

As will be seen in Figures 1 to 4 the units 1, 2 and 3 are balanced one on another the supporting ones being provided with upwardly projecting balancing stems 5 provided with V-shaped balancing notches 6, while the supported units are provided with balancing rests or seats 7 likewise provided with V-shaped notches which seat in the V-notches 6. Members 1, 2 and 3 are hollow bodies as indicated by the dotted lines 1a, 2a and 3a in Figure 1, and their legs or lower portions 1' and 1'', 2' and 2'', and 3' and 3'' constitute cavities for counterweight materials C, such as lead shot. This shot may be placed in the cavities or receptacles through openings, afterwards sealed, in the material composing the units, which material may be any preferred substance. The amount of counter weight material in these cavities is proportioned to the counter balancing effect required. The chambers 3' and 3'' require more than the chambers 2' and 2'', while the chambers 2' and 2'' require more than the chambers 1' and 1''. This is by reason of the fact that the lower units must counter balance the over balancing effect of the upper units thereon. The rest 7 of unit 3 rests upon the horizontal bar 9 of the upright support 10, upon which it is balanced, this member forming a support for the assembled advertising device. From the lower balancing unit 3, if desired, may be suspended a unit 4. This suspension may be rigid, in which event unit 4 acts as a counter balance, or it may be flexibly connected to the member 3 by the link 11 which is provided with eyes 12 at each end, which eyes connect to staples 13, one in the member 3 and the other in the member 4. In this connection the member 4 acts as a counter weight for the member 3.

Figure 2:
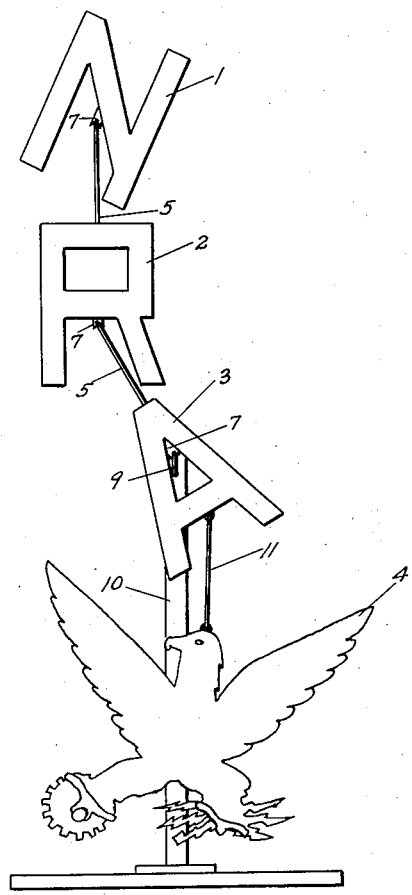
Figure 2 is similar to Figure 1, and shows the individual units rocking or gyrating.
Figure 7:
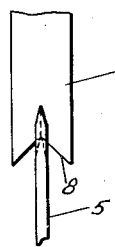
Figures 7 and 8 are respectively front and side elevations of portions of the balancing stems or arms and show the construction which limits rotary movement of the units with regard to one another.
Figure 8:
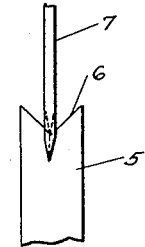

In viewing Figures 1 to 4, it will be seen that the units after assembly upon one another may be subjected to a limited amount of swaying and gyrating movement to the end as seen in Figures 2 and 4 it appears that the entire assembly is about to tumble, which is not the case, for the counter balancing is so accurately controlled that the units, if not subjected to some uncontrolled force, constantly maintain their balancing association. As before stated such is the, or one of the objects of the invention, to create in onlookers the sensation or belief that the assembly is about to tumble.

Figures 9, 10, 11:
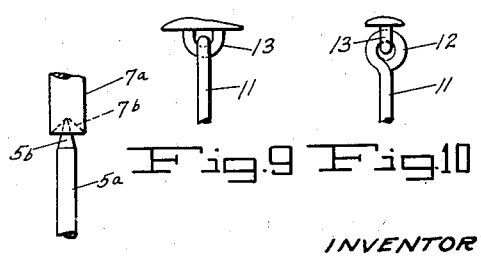
Figures 9 and 10 are respectively front and side elevations of means or connections for suspending one or more of the units.
Figure 11 is an elevation of a modification of the construction shown in Figures 7 and 8 and which permits the units to revolve with regard to each other.

Figure 11 shows a modification in the means for mounting the units 5 and 7 here designated as 5a and 7a wherein the stem 5a is provided with a point 5b which seats in a cone recess 7b of rest 7a. This construction permits the units to rotate with respect to each other.

Figures 5 and 6 show modifications of the invention. In this instance the unit 4' is rockably supported upon the horizontal bar 14. Member 4' is provided with three upright balancing stems 5 which form the balancing support for the units 16, 17 and 18. These units like units 1, 2 and 3 are provided with rest 7 seating upon the members 5 as previously described.

Having described my invention, I claim—

1. The herein described balanced advertising device, including a plurality of units provided with balancing fulcrums, counter balancing means for maintaining said units substantially upright upon said fulcrums, said units being balanced one upon the other, and the counter balancing means of the lower units being increased to overcome the overbalancing effect of the units thereabove.

2. The herein described balanced advertising device, including a plurality of units provided with balancing seats, counter balancing means for maintaining said units substantially upright upon said seats, said units balancing one upon the other, and the counter balancing means of the lower units being sufficient to avoid the overbalancing effect of the units balanced thereon.

3. The herein described balanced advertising device, including a plurality of units disposed one upon another, each unit having cavities for the retention of counter balancing materials whereby each unit is held substantially upright upon the unit immediately beneath, and the counter balancing materials of the supporting units being sufficient to prevent their overbalancing by the supported units.

4. The herein described balanced advertising device, including a plurality of units provided with balancing fulcrums, counter balancing means for maintaining said units substantially upright upon said fulcrums, said units being balanced one upon the other, the counter balancing means of the lower units being increased to overcome the overbalancing effect of the units thereabove, and a stationary stand upon which the lowermost balancing unit is balanced.

5. The herein described balanced advertising device, including a plurality of units provided with seats upon which they are adapted to be balanced, one of said units being balanced upon a stationary support, the other units being balanced one upon another thereon, each unit provided with counter balancing properties designed to maintain them essentially in an upright position, and the counter balancing properties of the supporting units being sufficient to prevent them becoming overbalanced by the units they support.

6. The invention as set forth in claim 5 including a unit pivotally suspended from the unit balanced upon the stationary support.

7. The balanced advertising device as set forth, including a plurality of units, said units being provided with cooperating balancing arms or stems whereby such units may be superposed one above the other, means for counterbalancing the upper units with regard to the lower units, and the counterbalancing means of the lower units exceeding that of the upper units in order to overcome the over-balancing effect of the upper units, substantially as set forth.

REX G. CRAIGHEAD.